Jan. 17, 1928.
O. E. HEUSTIS
1,656,634
COMBINATION TOOL
Filed Jan. 13, 1927
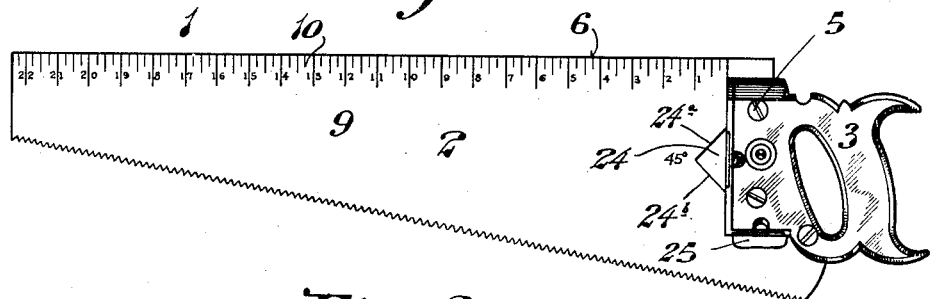
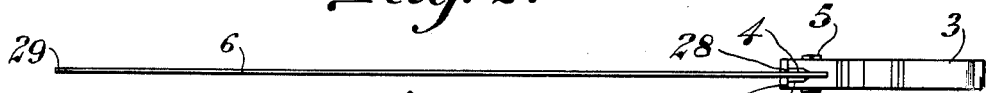
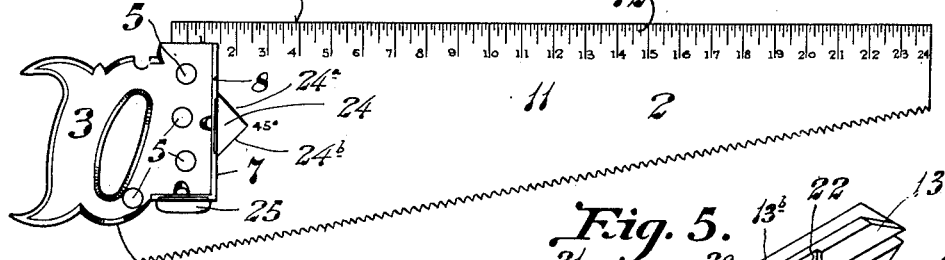
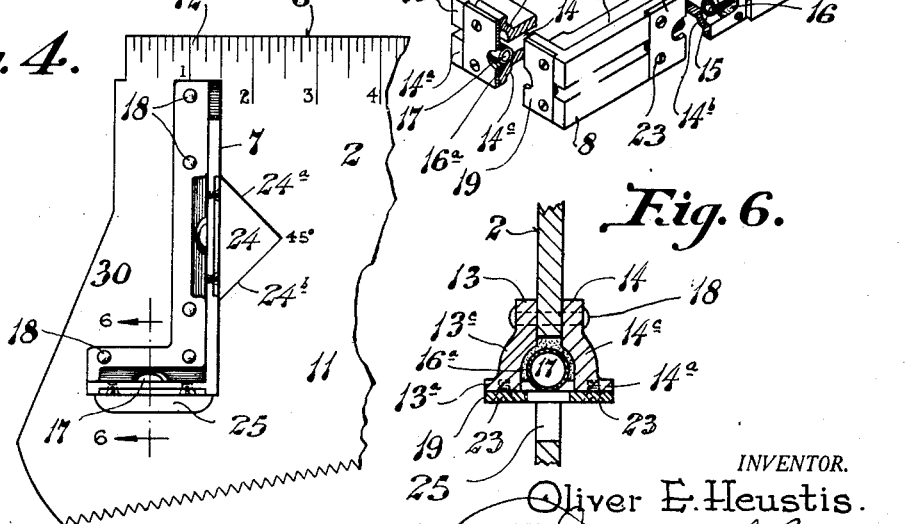
INVENTOR.
Oliver E. Heustis.
BY James N. Ramsey
ATTORNEY.

Patented Jan. 17, 1928.

1,656,634

UNITED STATES PATENT OFFICE.

OLIVER E. HEUSTIS, OF LAWRENCEBURG, INDIANA.

COMBINATION TOOL.

Application filed January 13, 1927. Serial No. 160,913.

This invention relates to a combination tool comprising a carpenter's saw, try-square, rule, miter, and spirit-levels.

The objects of the invention are to provide, as an article of manufacture, a simple, compact, durable and efficient tool combining the several features of a saw, rule, miter, and spirit levels whereby it may be conveniently used by carpenters and others to perform its several functions without the inconvenience and expense of several separate tools for the desired uses and whereby the several features may be conveniently used in connection with the tool in performing a given piece of work.

Another object of my invention is to provide a combination tool of this character which will be economical to manufacture and save the trouble, inconvenience and expense of several separate tools.

Other objects and advantages will be in part indicated in the description and in part rendered apparent therefrom in connection with the drawing.

My invention consists in providing a carpenter's saw, the back of which extends upward beyond the handle and which is marked or graduated with inches and fractional parts thereof, means attached to and reinforcing the handle, the handle forming a try-square, an opening in the saw blade adjacent the handle forming a miter, and levels securely mounted in said handle and try-square.

My invention also consists in the construction, combination, location and arrangement of parts, as herein set forth and claimed.

In the drawing:

Fig. 1 is a side elevation of a carpenter's saw embodying my invention;

Fig. 2 is an edge view thereof;

Fig. 3 is a view similar to Fig. 1, but showing the opposite side of the saw;

Fig. 4 is an enlarged view of the butt end of the saw blade with the handle removed, showing the miter, try-square, spirit-levels, and a portion of the rule and saw blade;

Fig. 5 is an isometric view partly shown in section of the spirit-levels, and one of the sides constituting the try-square; and Fig. 6 is an enlarged vertical cross-section taken on a plane corresponding to line 6—6 of Fig. 4.

In the embodiment of my invention as illustrated and which shows a preferred construction I provide a carpenter's saw 1, comprising blade 2 and handle 3. Said handle 3 is provided with usual central slot 4 which removably receives saw blade 2. Said blade 2 is detachably held within said slot 4 of handle 3 in the usual manner, as by bolts 5.

The upper edge 6 of saw blade 2 is straight and disposed at right angles to the face 7 of spirit-level housing 8, as clearly shown in Figs. 1, 3 and 4, respectively.

The side 9 of blade 2 is provided with graduations 10 near the upper edge 6 which graduations are preferably divided into inches and one-quarter inches. The opposite side 11 of saw blade 2 is also provided with graduations 12 near upper edge 6, which graduations are divided into inches and one-eighth inches.

The spirit-level housing 8 comprise right-angle members 13 and 14, respectively, which are provided with integral right-angle flanges 13$^a$ and 14$^a$.

Midway the long side of right-angle members 13 and 14 are outwardly formed pocket recesses 13$^b$ and 14$^b$ and midway the short side of right-angle members 13 and 14, respectively, are similar outwardly formed pocket recesses 13$^c$ and 14$^c$, as clearly shown in the sectional view, Fig. 6.

Spirit-level 15 is slightly shorter in length than the insides of pocket recesses 13$^b$ and 14$^b$ and is received therein and held against displacement in any suitable manner, as for example, by cement 16.

Spirit-level 17 is slightly shorter in length than the insides of pocket recesses 13$^c$ and 14$^c$ and is held therein as by cement 16$^a$.

Right-angle member 13 is mounted upon side 11 of saw blade 2 and right-angle member 14 is oppositely mounted on side 9 of said blade, said members 13 and 14, respectively, being thus securely fastened on opposite sides of said blade, as by rivets 18 (see detail view Fig. 4), and forming a double try-square, one part on each side.

Tie plates 19 and 20, respectively, are received by recesses 21 and 22 of right angle flanges 13$^a$ and 14$^a$, respectively, and are detachably held therein by screws 23.

Opening 24 in saw blade 2 is located adjacent face 7 of housing 8 and its sides 24$^a$ and 24$^b$, being disposed at a 45° angle relative to said face 7, form a small double miter which may be successfully used for all small work.

The opening 24 also serves as a "light" whereby the reading of the spirit level may be easily viewed from either side of the saw blade 2. Opening 25, cut in blade 2 adjacent spirit-level 17, is also used as a light for easily reading said level from either side of said saw blade.

Handle 3 is provided with enlarged recess 26, which extends inwardly from edges 27 and 28 of said handle to a depth sufficient to receive right-angle members 13 and 14, respectively.

To assemble my improve combination tool, start with the blade 2, assuming that the miter opening 24, light opening 25 and the holes for rivets 18, have been cut therein and that graduations 10 and 12, respectively, have been etched on sides 9 and 11 near upper edge 6 of said blade 2.

The next step is to mount right-angle member 13 upon side 11 and right-angle member 14 upon side 9 of blade 2 and securely fasten said members upon said blade and in registering position with each other by rivets 18, as clearly shown in Figs. 4 and 6.

Then insert spirit-level 15 within pocket recesses 13$^b$ and 14$^b$ of right-angle members 13 and 14, respectively, and securely fix said spirit-level therein with cement 16.

Next place tie-plate 20 within recesses 22 and securely fasten it to right-angle members 13 and 14 by screws 23.

Next insert the level 17 within recesses 13$^c$ and 14$^c$ of right-angle members 13 and 14, respectively, and securely fasten it therein by cement 16$^a$ and place the tie plate 19 within recesses 21 and securely fasten it to right-angle members 13 and 14, respectively, by screws 23, as clearly shown in Fig. 5.

The saw blade 2 is now ready to receive handle 3. To attach the handle 3, insert the butt end 30 of blade 2 within recess 4 of said handle 3 until the right-angle flanges 13$^a$ and 14$^a$ of level housing 8 rests against said handle, as shown in Figs. 1, 2 and 3, respectively. Then secure said handle 3 to blade 2 by usual bolts 5.

It will be understood that certain changes and modifications of the invention can be made without departing from the scope or spirit thereof as defined in the claims.

What I claim as new and desire to secure by Letters Patent is:

1. As an article of manufacture, a combination tool comprising a saw blade, a handle detachably secured to said blade, right-angle members received by said handle, a level mounted within said right-angle members and handle, one of said right-angle members disposed at a right angle relative to the upper edge of said saw blade whereby a try-square is formed, and a miter formed adjacent said last-mentioned right-angle member.

2. As an article of manufacture, a combination tool comprising a saw blade having a handle detachably mounted thereon, right-angle members securely attached to opposite sides of said blade and provided with recesses, a level securely fixed in each recess, and a miter formed in said blade adjacent the forward edge of said handle, substantially as described.

OLIVER E. HEUSTIS.